United States Patent [19]

Kim

[11] Patent Number: 5,711,290
[45] Date of Patent: Jan. 27, 1998

[54] BOTTOM STRUCTURE FOR MULTI-PLY IMPACT BONDED BOTTOM COOKWARES

[76] Inventor: Myung-Suk Kim, Hyundae Apartment 112-603, 297, Abgujeong-Dong, Kangnam-Ku, Seoul, Rep. of Korea

[21] Appl. No.: 652,801

[22] Filed: May 23, 1996

[30] Foreign Application Priority Data

May 24, 1995 [KR] Rep. of Korea .................. 95-11250

[51] Int. Cl.$^6$ .................................................. A47J 27/00
[52] U.S. Cl. ........................................ 126/390; 220/626
[58] Field of Search ............................ 126/390; 220/912, 220/626

[56] References Cited

U.S. PATENT DOCUMENTS

| | | | |
|---|---|---|---|
| 4,204,607 | 5/1980 | Zani | 126/390 |
| 4,596,236 | 6/1986 | Eide | 126/390 |
| 5,487,329 | 1/1996 | Fissler | 126/390 |
| 5,564,590 | 10/1996 | Kim | 126/390 |

*Primary Examiner*—Carroll B. Dority
*Attorney, Agent, or Firm*—Nawrocki, Rooney & Sivertson, P.A.

[57] ABSTRACT

An improved bottom structure for multi-ply impact bonded bottom cookware is disclosed. The bottom structure with an aluminum ply has a stainless capsule that capsules the edge portion of the aluminum ply to compensate for the thermal brittleness of the aluminum ply, thereby preventing the edge portion of the aluminum ply from being cracked or broken due to the thermal brittleness. The capsule also joins the ends of a net member to the aluminum ply to integrate the net member with the aluminum ply and covers the edge portion of the aluminum ply to provide an improved appearance of the cookware. The stainless capsule effectively guides heat to the central portion of the bottom and causes the bottom to be uniformly heated, thereby preventing the food inside the bottom corner from getting partially scorched about and sticking to the interior of the bottom corner.

5 Claims, 6 Drawing Sheets

BOTTOM STRUCTURE FOR MULTI-PLY IMPACT BONDED BOTTOM COOKWARES

BACKGROUND OF THE INVENTION

1. Field of the Invention

The present invention relates in general to multi-ply impact bonded bottom cookwares with an aluminum ply suitable for improving the heat transfer rate of the cookware's bottom and, more particularly, to a structural improvement in the bottom structures of such cookwares for tightly capsuling the edge portion of the aluminum ply to compensate for the thermal brittleness of the ply and to prevent the above edge portion from cracking or breaking due to the thermal brittleness, and to provide an improved bottom appearance of the cookware.

2. Description of the Prior Art

Conventionally, metallic cookware such as stew pots are mainly constructed of a stainless steel capable of protecting the cookware from rusting. The base bottom or the stainless base bottom of such cookware is preferably provided with an aluminum ply suitable for improving the heat transfer rate of the bottom. The aluminum ply is brazed to the outer surface of the stainless base bottom. An additional stainless ply is brazed to the above aluminum ply to form the outermost bottom of the cookware. The stainless ply forming the outermost bottom protects the aluminum ply from damage and rust. In order to bond the above stainless ply to the aluminum ply, the stainless ply may be instantaneously pressed down onto the aluminum ply by a pressing device such as a friction press. Alternatively, the stainless ply may be bonded to the aluminum ply through high-frequency heating using powder or flux as a solvent. Hence, the above cookware has a tri-ply bottom structure comprising the stainless steel vessel, the aluminum ply pressed to the vessel and the additional stainless ply pressed to the aluminum ply. In this regard, the above cookwares are named as tri-ply bottom structured cookwares.

However, such cookware with the tri-ply bottom structure wastes the aluminum material for the aluminum ply forming the outermost bottom, thereby increasing the cost of the cookware. The above cookware must be used with specific heating devices, limiting the cookware in its use. Since the outermost bottom of the cookware is constructed of the same material or the stainless steel and has a simple, flat surface, the bottom of the above cookware poorly receives heat. In this regard, when the cookware is laid on and heated by a heating device such as a gas range, the flames of the heating device heat the flat bottom and in turn pass by the rounded bottom corner of the cookware regrettably disappearing into the atmosphere. This causes considerable heat loss and wastes fuel. Furthermore, the flames of the heating device heat intensively the single-ply bottom corner of the cookware while passing by the above bottom corner. The food inside the bottom corner is thus partially scorched about and sticks to the interior of the bottom corner.

In an effort to solve the above problems, the applicant of this invention proposed "a multi-ply impact bonded bottom cookware and method for producing such" in Korean Patent Appln. No. 95-8467.

The bottom structure of the above Korean cookware is shown in the accompanying drawing, FIG. 1. As shown in FIG. 1, the multi-ply impact bonded bottom cookware 10 comprises a stainless base body whose bottom is added with an aluminum ply 20 on its outer surface for improving the heat transfer rate. A ferrous or nonferrous metallic net member 30 eats into the above aluminum ply 20 to form the same plane as the outer surface of the ply 20. In order to set the net member 30 in the aluminum ply 40, the net member 30 is laid on the ply 20 prior to being pressed down into the ply 20. The above net member 30 improves the structural strength of aluminum ply 20, the heat transfer rate, the heat conductivity and the heat preservation effect of the cookware's bottom. The above net member 30 uniformly transfers heat to the bottom and prevents the bottom from being partially overheated thus improving the operational reliability of the cookware. The net member 30 also gives an improved appearance to the bottom.

However, the above cookware has the following problems. The aluminum ply 20, particularly its edge portion E that is repeatedly overheated for a long time thermally corrodes and cracks due to thermal brittleness. Due to the above thermal brittleness, the edge portion E of the ply 20 may break easily when receiving an external shock. Therefore, the operational reliability of the cookware is reduced.

In addition, the above edge portion E of the ply 20 is directly exposed outside the cookware. The exposed edge portion E causes a bad appearance of the cookware since the color and brightness of the portion E are different from those of the stainless portions of the cookware. Due to this bad appearance, the competiveness of the cookware is reduced.

SUMMARY OF THE INVENTION

It is, therefore, an object of the present invention to provide an improved bottom structure for multi-ply impact bonded bottom cookwares in which the aforementioned problems can be overcome. The bottom structure includes an aluminum ply for improving the heat transfer rate and a stainless capsule for capsuling the edge portion of the aluminum ply to compensate for the thermal brittleness of the aluminum ply, thereby preventing the edge portion of the aluminum ply from cracking or breaking due to thermal brittleness. The above capsule also joins the ends of a net member to the aluminum ply to integrate the net member with the aluminum ply and covers the edge portion of the aluminum ply to provide an improved appearance of the cookware.

It is another object of the present invention to provide an improved bottom structure for multi-ply impact bonded bottom cookwares in which the stainless capsule effectively guides heat of a heating device to the central portion of the bottom causing the bottom to be uniformly heated, thereby preventing the food inside the rounded bottom corner from getting partially scorched about and sticking to the interior of the bottom corner.

In order to accomplish the above objects, the present invention provides a bottom structure for multi-ply impact bonded bottom cookwares comprising a stainless base body and an aluminum ply pressed to the outer bottom of the stainless base body for improving the heat transfer rate of the bottom, further comprising: means for capsuling an edge portion of the aluminum ply to compensate for the thermal brittleness of the aluminum ply and to prevent the edge portion from cracking or breaking due to the thermal brittleness, the capsuling means being impact bonded to the edge portion of the aluminum ply to form the same plane as the outer surface of the aluminum ply and having at least one opening on its central portion for partially exposing the outer surface of the aluminum ply.

In an embodiment, the capsuling means is a stainless capsule whose central portion is largely perforated to form one central opening.

In another embodiment, the capsuling means is a stainless capsule whose central portion is perforated several times to form a plurality of uniformly-arranged openings.

BRIEF DESCRIPTION OF THE DRAWINGS

The above and other objects, features and other advantages of the present invention will be more clearly understood from the following detailed description taken in conjunction with the accompanying drawings.

DESCRIPTION OF THE PREFERRED EMBODIMENTS

Figure 1:
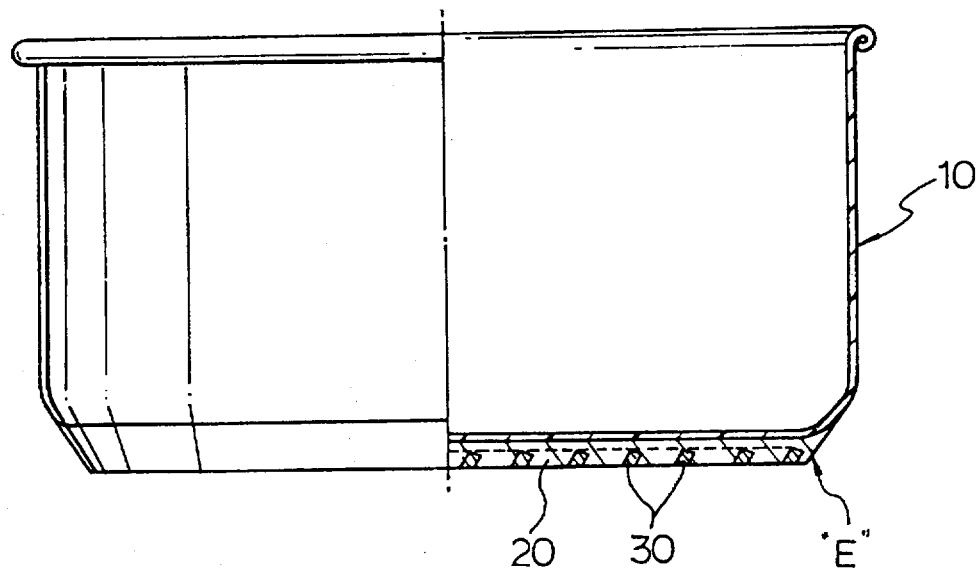
FIG. 1 is a sectional view showing the bottom structure of a typical multi-ply impact bonded bottom cookware.
Figure 2:
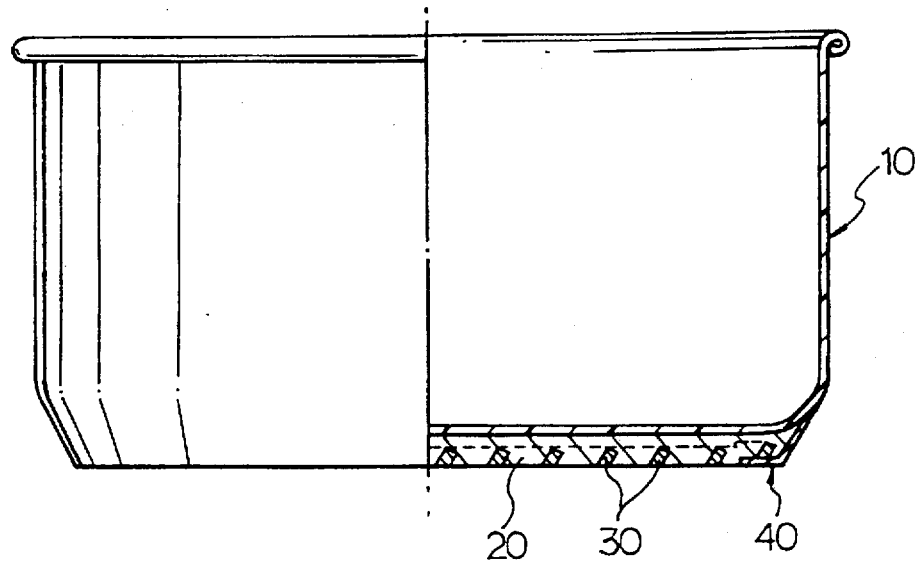
FIG. 2 is a sectional view showing the bottom structure of a multi-ply impact bonded bottom cookware in accordance with a primary embodiment of the present invention.
Figure 3:
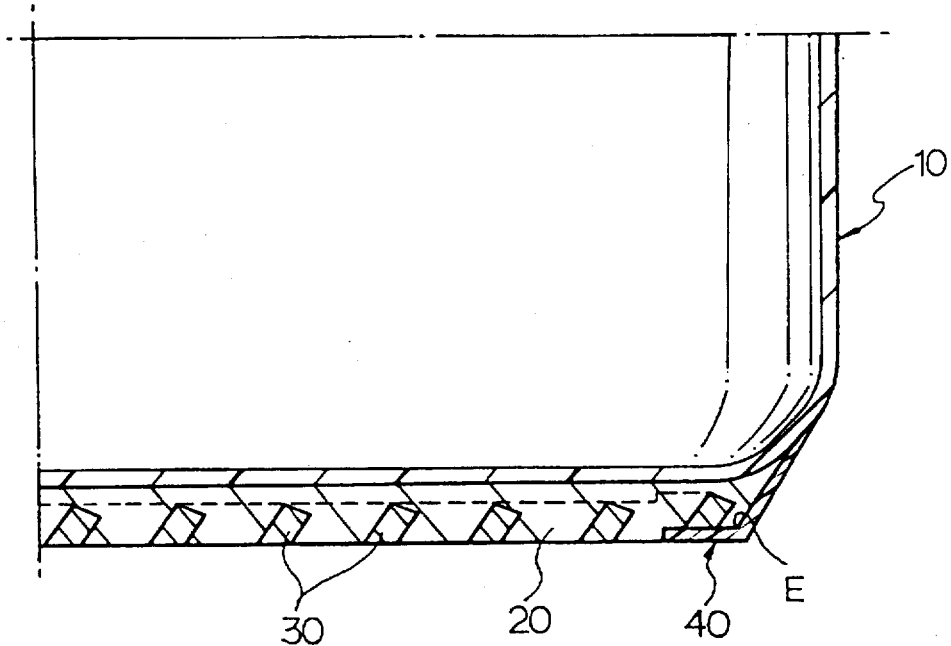
FIG. 3 is a partially enlarged sectional view of the cookware of FIG. 2.
Figure 4:
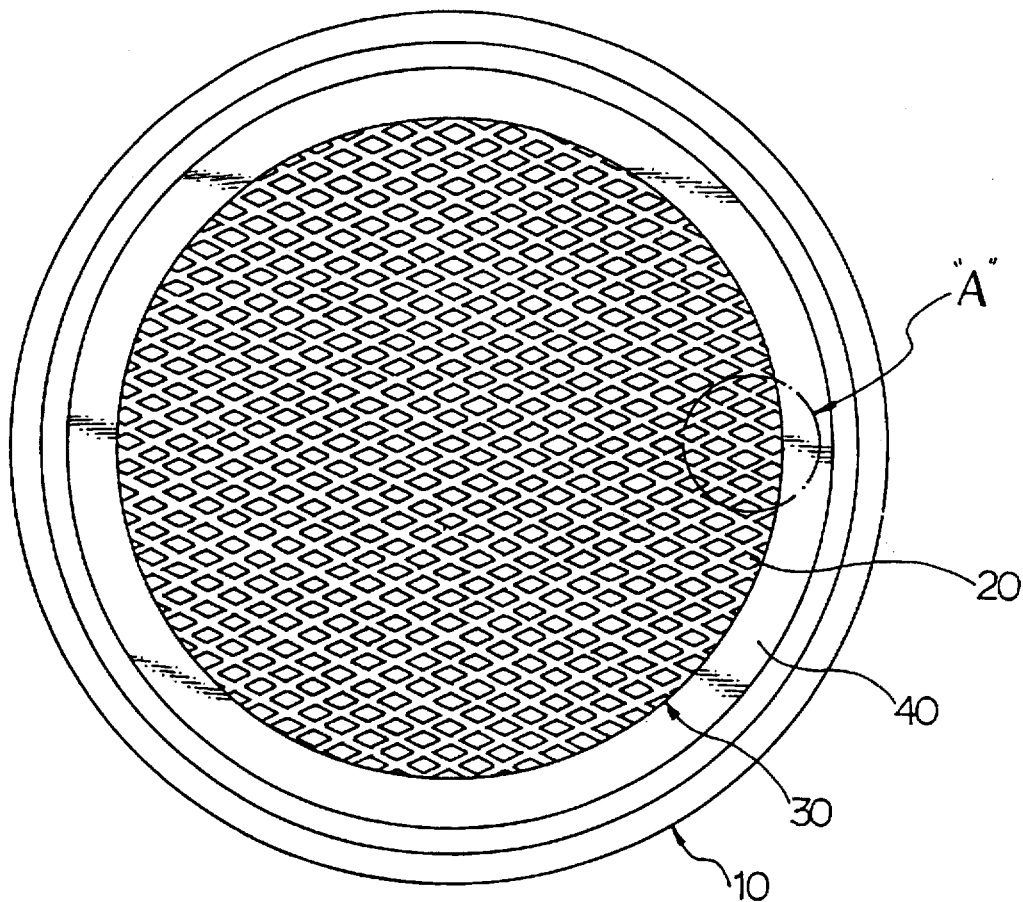
FIG. 4 is a bottom view of the cookware of FIG. 2.
Figure 5:
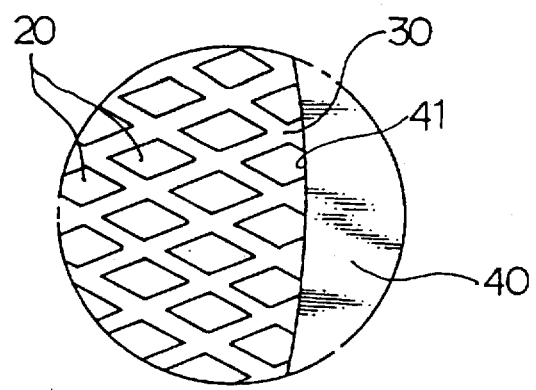
FIG. 5 is an enlarged view showing the structure of the encircled portion "A" of FIG. 4.
Figure 6:
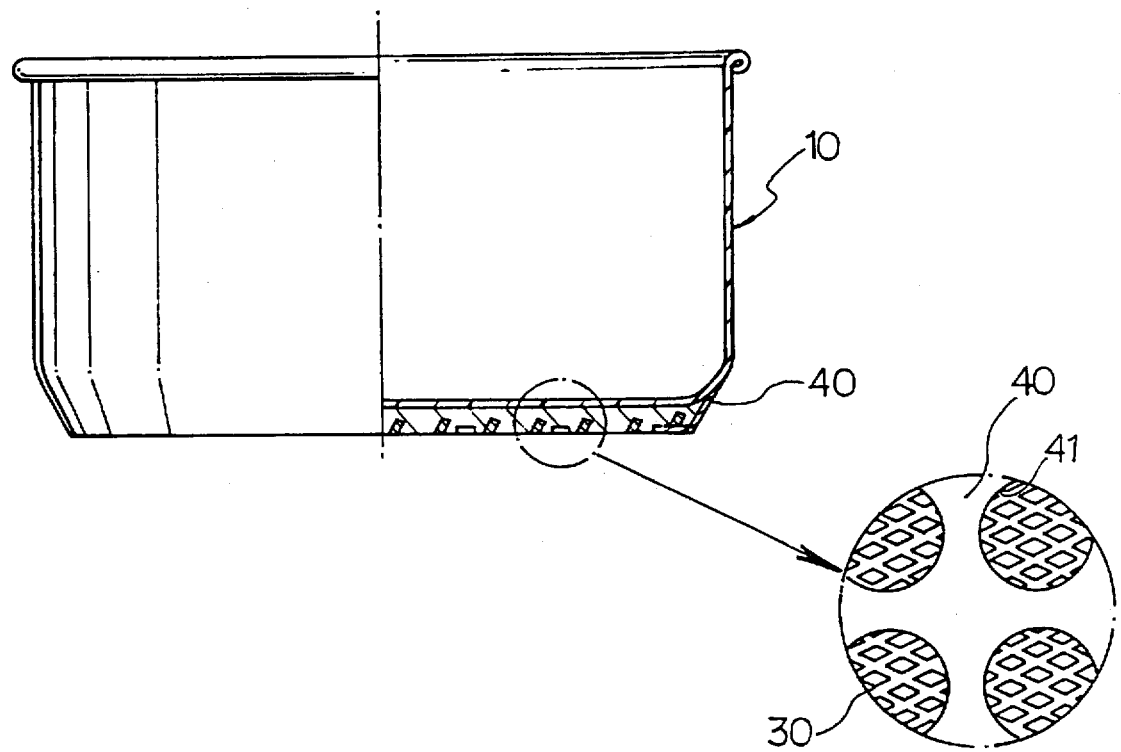
FIG. 6 is a sectional view showing the bottom structure of a multi-ply impact bonded bottom cookware in accordance with another embodiment of the present invention.

FIGS. 2 and 3 are sectional views showing the bottom structure of a multi-ply impact bonded bottom cookware in accordance with a primary embodiment of the present invention. FIGS. 4 and 5 are bottom views of the cookware of FIG. 2.

In the bottom structure according to the primary embodiment, an aluminum ply 20 is pressed to the base bottom of the stainless cookware 10 to improve the heat transfer rate of the cookware's bottom. The aluminum ply 20 in turn is provided with a metallic net member 30 whose material is different from that of the ply 20. The above net member 30 is set in the aluminum ply 20 by a pressing procedure to form the same plane as the outer surface of the ply 20. The member 30 improves the structural strength of the ply 20, the heat transfer rate, heat conductivity and heat preservation effect of the cookware bottom. The above-mentioned structure remains the same as described for the bottom structure disclosed in Korean Patent Appln. No. 95-8467.

In accordance with the present invention, the edge portion E of the aluminum ply 20 with the net member 30 is tightly covered with edge capsuling means for compensating for the thermal brittleness of the ply 20 thereby preventing the edge portion E from cracking or breaking due to the thermal brittleness. In the primary embodiment, the edge capsuling means is a stainless capsule 40 that is mounted to the edge portion E of the ply 20 to form the same plane as the outer surface of the aluminum ply 20. The central portion of the above capsule 40 is largely perforated to form a circular central opening 41 suitable for totally showing the framework of the net member 30. The configuration of the bottom structure according to the primary embodiment is best shown in FIG. 4.

In accordance with a second embodiment of the present invention, the edge capsuling means is a stainless capsule 40 whose central portion is perforated several times to form a plurality of circular openings 41. The above openings 41 are uniformly arranged on the capsule 40 and partially show the framework of the net member 30. The above capsule 40 gives an improved appearance to the bottom structure.

In the above embodiments, the aluminum capsule 40 tightly joins the ends of the net member 30 to the edge portion E of the ply 20. The capsule 40 thus effectively integrates the member 30 with the ply 20 and improves the flame resistance of the edge portion E thereby preventing the portion E from cracking or breaking due to the thermal brittleness of the ply 20.

Figure 7:
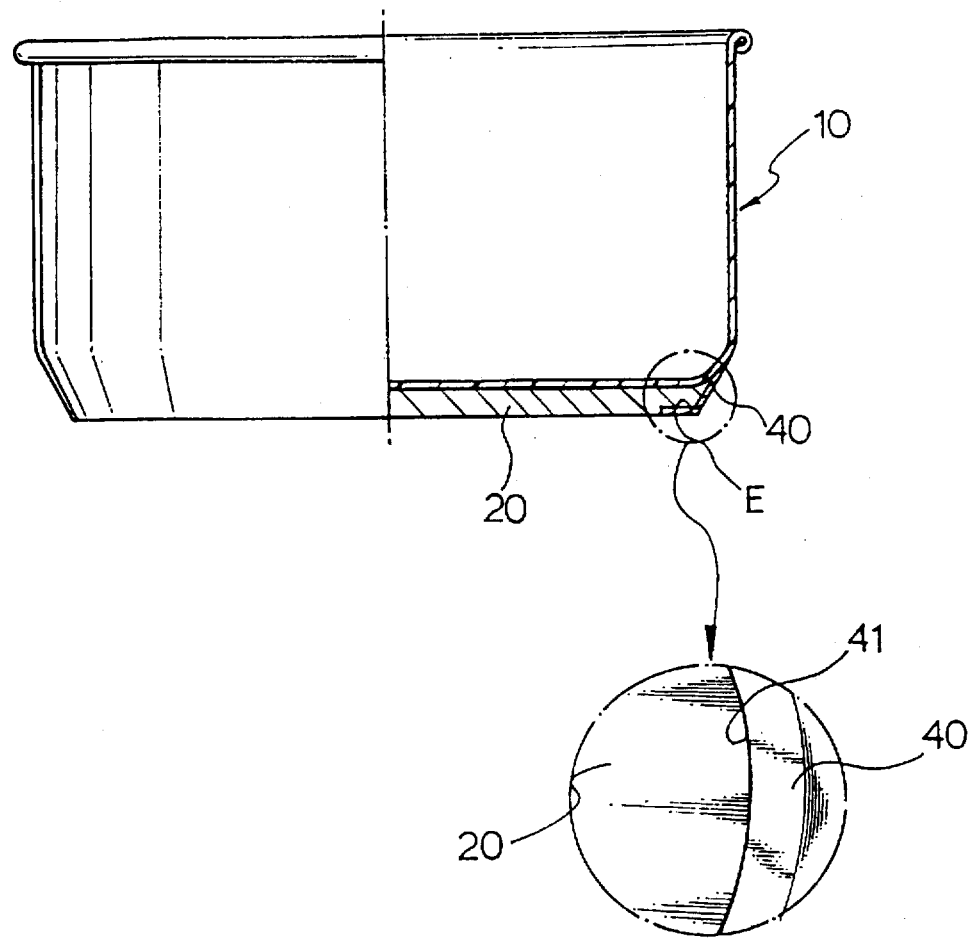
FIG. 7 is a sectional view showing the bottom structure of a multi-ply impact bonded bottom cookware in accordance with a further embodiment of the present invention.
Figure 8:
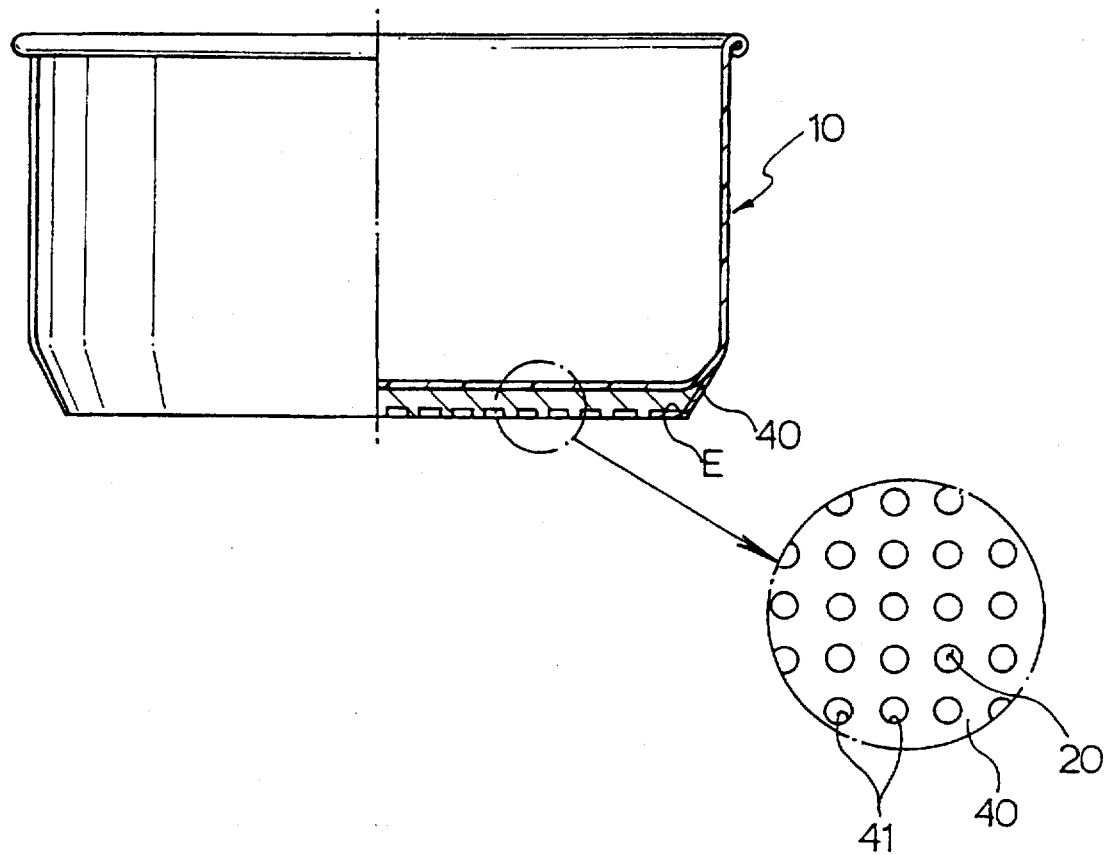
FIG. 8 is a sectional view showing the bottom structure of a multi-ply impact bonded bottom cookware in accordance with still another embodiment of the present invention.

FIGS. 7 and 8 show bottom structures in accordance with third and fourth embodiments of the present invention, respectively. In the third and fourth embodiments, the general shapes of the bottom structures remain the same as in the primary and second embodiments respectively, but the aluminum ply 20 of each of the third and fourth embodiments do not have the net member 30 differently from the primary and second embodiments. That is, the edge portion E of the aluminum ply 20 in the third embodiment is tightly covered with the stainless capsule 40 that has the circular central opening 41. The above stainless capsule 40 is pressed to the edge portion E to form the same plane as the outer surface of the ply 20. In the fourth embodiment, the edge portion E of the ply 20 is tightly covered with the stainless capsule 40 that has the plurality of circular openings 41. In each of the above third and fourth embodiments, the bottom structure of the cookware improves the heat transfer rate of the bottom by the aluminum ply 20 and compensates for the thermal brittleness of the ply 20 by the capsule 40, thus preventing the edge portion E of the ply 20 from being cracked or broken due to the thermal brittleness. Therefore, the above capsule 40 lengthens the expected life span of the multi-ply impact bonded bottom cookwares.

As described above, the present invention provides an improved bottom structure for multi-ply impact bonded bottom cookwares. The bottom structure of this invention includes a stainless capsule which tightly covers the edge portion of the aluminum ply mounted to the base bottom of a stainless cookware, thereby compensating for the thermal brittleness of the aluminum ply and preventing the edge portion of the aluminum from being cracked or broken due to the thermal brittleness. When a ferrous or nonferrous metallic net member is set on the above aluminum ply to improve the structural strength of aluminum ply, the heat transfer rate, the heat conductivity and the heat preservation effect of the bottom, the stainless capsule tightly joins the ends of the net member to the aluminum ply. In this case, the capsule achieves the integration of the net member with the aluminum ply thus lengthening the expected life span of the cookwares and improves the appearance of the bottom.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bottom structure for multi-ply impact bonded bottom cookwares comprising a stainless base body and an aluminum ply pressed to the outer bottom of said stainless base body for improving the heat transfer rate of the bottom, further comprising:

means for capsuling an edge portion of said aluminum ply to compensate for the thermal brittleness of said aluminum ply and to prevent said edge portion from being cracked or broken due to the thermal brittleness, said capsuling means being impact bonded to said edge portion of the aluminum ply to form the same plane as the outer surface of the aluminum ply and having at least one opening on its central portion for partially exposing the outer surface of the aluminum ply.

2. The bottom structure according to claim 1, wherein said capsuling means is a stainless capsule whose central portion is largely perforated to form one central opening.

3. The bottom structure according to claim 2, wherein said capsuling means is a stainless capsule whose central portion is perforated several times to form a plurality of uniformly-arranged openings.

4. The bottom structure according to claim 2, wherein said aluminum ply is provided with a ferrous or nonferrous metallic net member for improving the structural strength of said aluminum ply, the heat transfer rate, the heat conductivity and the heat preservation effect of the cookware's bottom, said net member eating into said aluminum ply to form the same plane as the outer surface of said aluminum ply.

5. The bottom structure according to claim 3, wherein said aluminum ply is provided with a ferrous or nonferrous metallic net member for improving the structural strength of said aluminum ply, the heat transfer rate, the heat conductivity and the heat preservation effect of the cookware's bottom, said net member eating into said aluminum ply to form the same plane as the outer surface of said aluminum ply.

* * * * *